US011899927B2

(12) United States Patent
Tensmeyer et al.

(10) Patent No.: US 11,899,927 B2
(45) Date of Patent: *Feb. 13, 2024

(54) SIMULATED HANDWRITING IMAGE GENERATOR

(71) Applicant: Adobe Inc., San Jose, CA (US)

(72) Inventors: Christopher Alan Tensmeyer, Provo, UT (US); Rajiv Jain, Vienna, VA (US); Curtis Michael Wigington, San Jose, CA (US); Brian Lynn Price, Pleasant Grove, UT (US); Brian Lafayette Davis, Provo, UT (US)

(73) Assignee: Adobe Inc., San Jose, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 17/648,718

(22) Filed: Jan. 24, 2022

(65) Prior Publication Data

US 2022/0148326 A1 May 12, 2022

Related U.S. Application Data

(63) Continuation of application No. 16/701,586, filed on Dec. 3, 2019, now Pat. No. 11,250,252.

(51) Int. Cl.
*G06K 9/00* (2022.01)
*G06F 3/04883* (2022.01)
(Continued)

(52) U.S. Cl.
CPC ......... *G06F 3/04883* (2013.01); *G06N 3/045* (2023.01); *G06N 3/08* (2013.01);
(Continued)

(58) Field of Classification Search
CPC ........... G06K 9/00416; G06K 9/00859; G06K 9/00879; G06K 9/224; G06F 3/04883; G06N 3/0454; G06N 3/08
See application file for complete search history.

(56) References Cited

U.S. PATENT DOCUMENTS

| 7,242,805 B1 * | 7/2007 | Reihani | G06K 9/00416 |
| | | | 382/177 |
| 2004/0148577 A1 * | 7/2004 | Xu | G06K 9/222 |
| | | | 715/268 |

(Continued)

OTHER PUBLICATIONS

C. G. Turhan and H. S. Bilge, "Variational Autoencoded Compositional Pattern Generative Adversarial Network for Handwritten Super Resolution Image Generation," 2018 3rd International Conference on Computer Science and Engineering (UBMK), 2018, pp. 564-568, doi: 10.1109/UBMK.2018.8566539. (Year: 2018).*

(Continued)

*Primary Examiner* — Fayyaz Alam
(74) *Attorney, Agent, or Firm* — Finch & Maloney PLLC

(57) ABSTRACT

Techniques are provided for generating a digital image of simulated handwriting using an encoder-decoder neural network trained on images of natural handwriting samples. The simulated handwriting image can be generated based on a style of a handwriting sample and a variable length coded text input. The style represents visually distinctive characteristics of the handwriting sample, such as the shape, size, slope, and spacing of the letters, characters, or other markings in the handwriting sample. The resulting simulated handwriting image can include the text input rendered in the style of the handwriting sample. The distinctive visual appearance of the letters or words in the simulated handwriting image mimics the visual appearance of the letters or words in the handwriting sample image, whether the letters or words in the simulated handwriting image are the same as in the handwriting sample image or different from those in the handwriting sample image.

20 Claims, 12 Drawing Sheets

(51) Int. Cl.
*G06N 3/08* (2023.01)
*G06V 30/32* (2022.01)
*G06V 30/228* (2022.01)
*G06V 30/226* (2022.01)
*G06N 3/045* (2023.01)
*G06V 10/82* (2022.01)
*G06V 10/44* (2022.01)

(52) U.S. Cl.
CPC ............ *G06V 10/454* (2022.01); *G06V 10/82* (2022.01); *G06V 30/228* (2022.01); *G06V 30/2264* (2022.01); *G06V 30/2276* (2022.01); *G06V 30/347* (2022.01)

(56) References Cited

U.S. PATENT DOCUMENTS

| | | | | |
|---|---|---|---|---|
| 2009/0189905 A1* | 7/2009 | Cho | ............... | G06K 9/6255 345/467 |
| 2014/0363083 A1* | 12/2014 | Xia | ............... | G06K 9/00422 382/189 |
| 2016/0328366 A1* | 11/2016 | Elarian | ............ | G06F 40/129 |
| 2019/0026019 A1* | 1/2019 | Guiavarc'h | ......... | G06F 3/04886 |
| 2019/0272447 A1* | 9/2019 | Wong | ............... | G06T 11/203 |
| 2021/0150789 A1* | 5/2021 | Szarzynski | ........ | G06K 9/00416 |

OTHER PUBLICATIONS

E. Alonso, B. Moysset and R. Messina, "Adversarial Generation of Handwritten Text Images Conditioned on Sequences," 2019 International Conference on Document Analysis and Recognition (ICDAR), 2019, pp. 481-486, doi: 10.1109/ICDAR.2019.00083. (Year: 2019).*

Ji, B. and T. Chen, "Generative Adversarial Network for Handwritten Text", arXiv:1907.11845v1, Jul. 27, 2019, 12 pages.

Eloi Alonso et al., "Adversarial Generation of Handwritten Text Images Conditioned on Sequences", Mar. 1, 2019, 6 pages.

Alex Graves, "Generating Sequences with Recurrent Neural Networks", University of Toronto, Jun. 5, 2014, 43 pages.

Turhan C.G. et al., "Variational Autoencoded Compositional Pattern Generative Adversarial Network for Handwritten Super Resolution Image Generation," 2018 3rd International conference on Computer Science and Engineering (UBMK), 2018, pp. 564-568, doi: 10.1109/UBMK.2018.8566539. (Year:2018).

* cited by examiner

Example 1
Handwriting sample image

*are studying them today. The conference*

Example 1
Simulated handwriting image

*May the Force be with you*
*Open the pod bay doors, please, HAL*
*They're taking the hobbits to Isengard*
*Do Or do not There is no try*

FIG. 6

Example 2
Handwriting sample image

*Mr. Brown, passionate and warm-hearted, led*

Example 2
Simulated handwriting image

*They're taking the hobbits to Isengard*
*No, I am your father*
*When I was your age, television was called books*
*In my experience, there is no such thing as luck*
*I've got a bad feeling about this*

FIG. 7

Example 3
Handwriting sample image the Prime Minister to Paris was dropped

Example 3
Simulated handwriting image

Life is like a box of chocolates
You never know what you're gonna get
The cake is a lie
"Inconceivable" You keep using that word
I do not think it means what you think it means

FIG. 8

The quick brown fox jumps over the lazy dog
May the force be with you
Life is like a box of chocolates. You never know what you're gonna get.

The quick brown fox jumps over the lazy dog
I've got a bad feeling about this
In my experience, there is no such thing as luck
} Same style The quick brown fox jumps over the lazy dog
May the Force be with you
Houston, we have a problem
Never tell me the odds The quick brown fox jumps over the lazy dog
Toto, I've a feeling we're not in Kansas anymore
Open the pod bay doors, please, HAL
} Same style The quick brown fox jumps over the lazy dog
May the force be with you
They're taking the hobbits to Isengard
} Same style The quick brown fox jumps over the lazy dog
If you build it, he will come
No, I am your father

FIG. 9

Open the pod bay doors, please, HAL } Raw generated image
Open the pod bay doors, please, HAL } After post-processing Houston, we have a problem } Raw generated image
Houston, we have a problem } After post-processing The quick brown fox jumps over the lazy dog
The quick brown fox jumps over the lazy dog May the Force be with you } Raw generated image
May the Force be with you } After post-processing When I was your age, television was called books
When I was your age, television was called books I've got a bad feeling about this } Raw generated image
I've got a bad feeling about this } After post-processing I've got a bad feeling about this
I've got a bad feeling about this

FIG. 10

SIMULATED HANDWRITING IMAGE GENERATOR

CROSS REFERENCE TO RELATED APPLICATIONS

This application is a continuation of U.S. patent application Ser. No. 16/701,586 (filed 3 Dec. 2019), the entire disclosure of which is hereby incorporated herein by reference.

FIELD OF THE DISCLOSURE

This disclosure relates to the field of digital image processing, and more particularly, to techniques for generating a digital image of simulated handwriting.

BACKGROUND

Handwriting is typically produced manually with the use of a writing instrument upon a medium, such as a pencil or pen upon paper or other writing surface, or a stylus or fingertip upon a touch-sensitive surface (for example, trackpad or touch screen display). Handwritten text, whether done in printed or cursive styles, includes letters, characters, or other markings that in combination with suitable spacings form words, phrases, and sentences. The visual appearance of handwriting includes, among other characteristics, the shape, size, slope, and spacing of the letters, characters, or markings. In contrast to an electronically produced typeface, where the appearance and spacing of the characters is generally uniform, the handwriting of an individual person is typically unique and different from the handwriting of other people and can even include variations by the same person.

Various attempts have been made to generate textual content having the appearance of handwriting using digital technologies. For example, some typeface fonts are designed to resemble the characteristics of cursive or printed handwriting. However, such fonts may still have a uniform appearance typical of machine-generated content and do not necessarily reflect the fine distinctions, subtleties, imperfections, and variations found in natural handwriting produced by humans. For example, certain letters in natural handwriting can appear differently depending on the adjacent letters in the word. For example, the two "1" letters in the word "hello" may be formed differently from each other if the handwriting stroke from the "e" to the first "1" is different from the stroke from the first "1" to the second one. Some digital fonts can use different glyphs depending on the surrounding characters, but it is difficult to capture all such letter combinations and in any event all such letter combinations will have an identical appearance, unlike natural handwriting. There is a need, therefore, for computer-generated, simulated handwriting that possesses more natural characteristics.

BRIEF DESCRIPTION OF THE DRAWINGS

FIGS. 6, 7, and 8 each shows an example image of actual handwriting as well as a corresponding example image of simulated handwriting that can be produced based on the actual image, in accordance with an embodiment of the present disclosure.

FIG. 9 shows several examples of raw generated images that can be generated by the process of FIG. 2, in accordance with various embodiments of the present disclosure.

FIG. 10 shows several examples of raw generated images and simulated handwriting images after post-processing, in accordance with various embodiments of the present disclosure.

DETAILED DESCRIPTION

Figure 1:
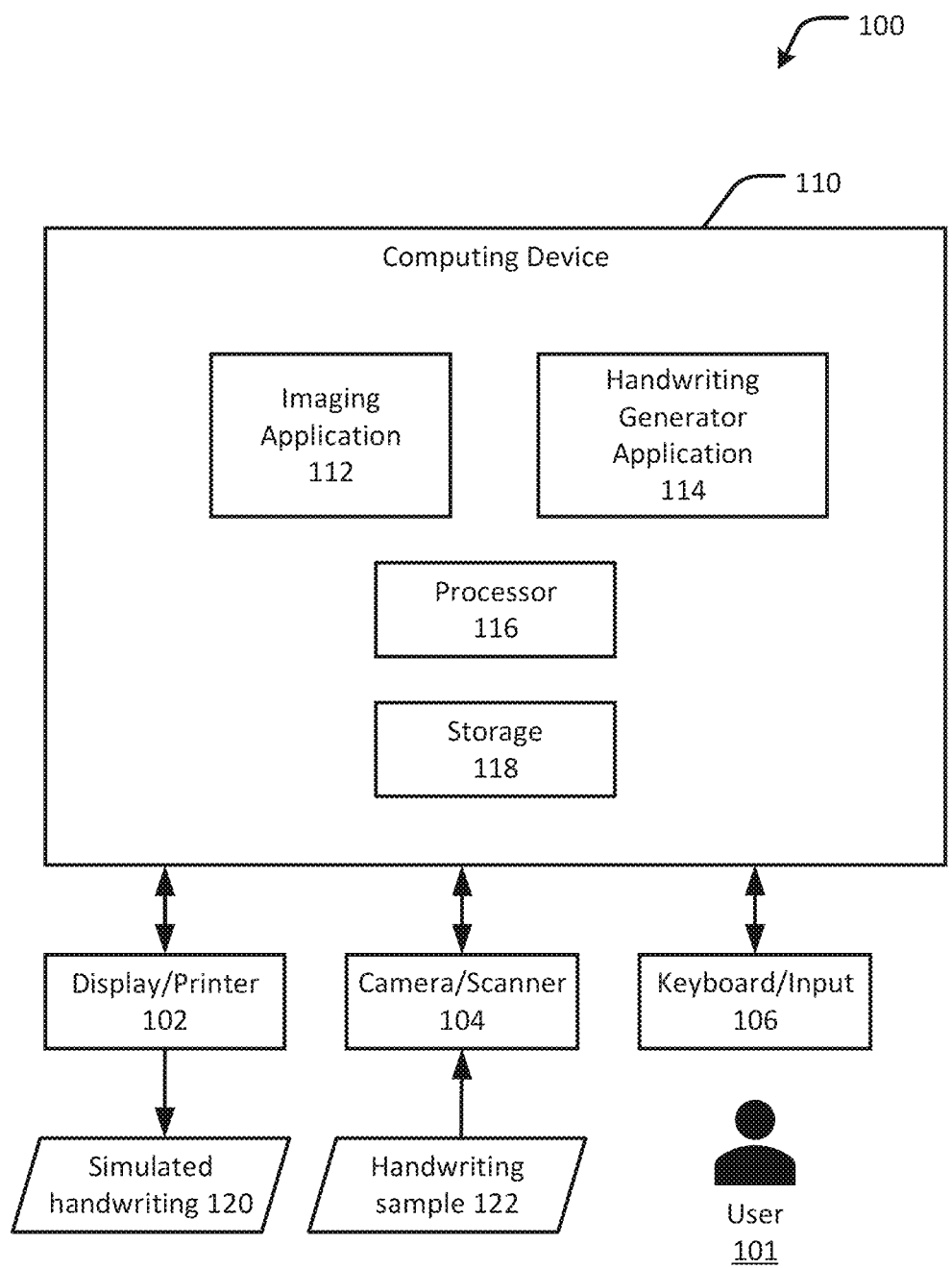
FIG. 1 is a block diagram of an example processor-based system programmed or otherwise configured for generating a digital image of simulated handwriting, in accordance with an embodiment of the present disclosure.

Techniques are provided for simulating handwriting, and in particular, for generating a digital image of simulated handwriting using a neural network, such as an encoder-decoder neural network, trained on images of natural handwriting samples. According to an embodiment, the simulated handwriting image is generated based on a style of a sample of actual handwriting and a variable length coded text input. The style represents visually distinctive characteristics of the handwriting sample, such as the shape, size, slope, and spacing of the letters, characters, or other markings in the handwriting sample. The variable length coded text input can be any textual content that is desired to be reproduced in the style of the handwriting sample. Thus, the resulting simulated handwriting image includes the variable length coded text input rendered in the style of the handwriting sample. The variable length coded text can be, for example, provided by a user, or extracted from a given source of content such as a digital document (for example, text file, word processor file, image, PDF), or an audio stream or file. Note that the variable length coded text can contain letters or words that are partially or completely different from those in the handwriting sample image. As such, the simulated handwriting image can contain letters or words that are different from those in the handwriting sample image, or the simulated handwriting image can contain the same letters or words as in the handwriting sample image. In any such cases, the distinctive visual appearance of the letters or words in the simulated handwriting image mimics or simulates the visual appearance of the letters or words in the handwriting sample image.

General Overview

Existing techniques for generating textual content having the appearance of natural handwriting rely on typeface fonts, which typically have a uniform appearance and do not reflect the fine distinctions, subtleties, imperfections, and variations found in actual handwriting produced by humans. Moreover, such typeface fonts tend to be arbitrary or fanciful, rather than representative of a given person's individual writing style. Thus, such existing solutions merely allow a user to pick a pre-existing handwriting font style that does not realistically reproduce the actual handwriting style of an individual. For instance, a typical electronic signature system allows a user to select a handwriting font from several pre-established fonts to represent that user's signature. However, the user's signature or natural handwriting is usually quite different from any of the pre-established handwriting font choices, and thus none of the font selections are meaningful representations of the user's natural handwriting. In some other existing techniques, a typographer can manually create a font that simulates an individual's handwriting or is otherwise customized for a unique appearance. However, the result is still a fixed font, where multiple occurrences of a single character have the same appearance.

To this end, the present disclosure provides techniques for simulating handwriting captured in a handwriting sample. In one such embodiment, the techniques include generating an image of text styled to mimic the natural handwriting of a person. Every person writes in a visually distinct manner, which is generally referred to herein as a "handwriting style," or simply a "style." As will be discussed in turn, and according to an embodiment, the techniques can be embodied in a system that includes one or more deep learning neural networks that are trained from one or more images of one or more handwriting samples to provide predictive models, which can be used to generate an image of simulated handwriting that mimics the style of a given handwriting sample or a blend of several such samples. Furthermore, the simulated handwriting can include any given text, even if the same text is not present in any of the handwriting samples. The given text can be, for example, provided by a user as textual input (whether typed or aurally presented by the user), or extracted from a textual content source such as a digital file or stream (e.g, text file or audio stream), or otherwise made available to the system. In this manner, any text can be converted into an image of simulated handwriting that mimics the style of any handwriting sample, regardless of the letters and words in the sample.

In some embodiments, a person's handwriting style is modeled as a vector in a neural network, which allows for fine-grained control over the simulated handwriting images, as will be explained in turn with reference to FIGS. 2-5. As a result, any variable length coded text input can be converted into a stylized, simulated handwriting image that approximates the natural handwriting of an individual or a blend of different handwriting styles.

Images of simulated handwriting that mimic a natural handwriting style are useful, for example, in multimedia applications with images or videos that contain handwriting, or for document forensics to determine authorship or forgery of documents. For example, a handwritten text recognition (HTR) model trained primarily with samples from a single author outperforms an HTR model trained using samples from many different authors. Producing data trained from a single author permits the HTR model to be tuned to that individual's handwriting style. Likewise, a robust HTR model can be trained from a diverse set of styles representing a blend or mixture of handwriting samples. This modeling technique contrasts with a fixed, pre-defined typeface font, which does not emulate the randomness and character-shape variations found in real handwriting. In some embodiments, simulated handwriting can be used to produce training data for a deep learning model that produces digital transcriptions from images of handwriting. Other uses will be apparent in light of this disclosure.

General Terminology

As used herein, in addition to its plain and ordinary meaning, the unqualified term "handwriting" refers to a person's real, natural writing as well as to simulated or artificial machine-generated representations of natural writing.

As used herein, in addition to its plain and ordinary meaning, the phrase "handwriting sample" and its synonyms (for example, sample of handwriting) refers to real, natural handwriting that can be digitized into an image. For example, handwriting on paper or another physical surface can be digitized into a machine-readable format, such as a bitmap image, a RAW format image, a JPEG image, an MPEG image, a GIF image, or any other available digital image format using a digital camera or scanner, to produce an image of a handwriting sample.

As used herein, in addition to its plain and ordinary meaning, the phrase "simulated handwriting" and its synonyms (for example, artificial handwriting) refers to handwriting artificially produced by a computer or other machine. A digital image of simulated handwriting, in any suitable electronic or hardcopy (printed) format, can be generated using the techniques described in this disclosure.

As used herein, in addition to their plain and ordinary meaning, the phrases "style" and "handwriting style" refer to qualitative data that can be used to approximate and characterize the visual appearance of letters and words in distinctive, natural handwriting. The data are obtained from samples of natural handwriting, such as one or more written words, and each sample is classified as a style. Different handwriting samples can thus be classified as different styles. The qualitative data for a given handwriting sample can be represented, for example, as a numeric vector of arbitrary length, where different vectors represent different styles. For example, if two handwriting samples are not identical, then each sample is considered to have a unique and different style even if the samples are created by the same person using similar handwriting. The similarity between styles can be determined as a function of the distance between vectors. Thus, in accordance with various embodiments, simulated handwriting mimics or replicates or otherwise simulates the style of natural handwriting.

System Architecture

FIG. 1 is a block diagram of an example processor-based system 100 programmed or otherwise configured for generating a digital image of simulated handwriting, in accordance with an embodiment of the present disclosure. The system 100 includes a computing device 110, a display or printer device 102, a camera or scanner device 104, and a keyboard or other input device 106 for inputting text. The computing device 100 includes an imaging application 112 that is configured to interact with the camera or scanner device 104 and the display or printer device 102. The computing device 100 further includes a handwriting generator application 114 that is configured to process image data obtained via the imaging application 112 to produce a simulated handwriting image. The imaging application 112 includes software and or/other components of the computing device 110 that operate the camera or scanner device 104 to obtain digital images. Using the imaging application 112, a user 101 can, for example, take a photograph of writing on a page of paper or scan the page into a digital format, and perform other features typically associated with using a camera or scanner 104. The imaging application 112 is also connected to the display or printer device 102, which provides a video or printed representation of the output of the system 100, such as an output image of simulated handwriting provided by the handwriting generator application 114.

The handwriting generator application 114 represents a component of the computing device 110 that, in some example embodiments, allows the user 101 to generate an image of simulated handwriting 120 that mimics the style, but not necessarily the content or text, of an image of a handwriting sample 122. More particularly, the handwriting generator application 114 is configured to interact with the imaging application 112, the camera or scanner device 104, and the display or printer device 102 to generate the simulated handwriting image 120. For example, the user 101 can, via the camera or scanner device 104, photograph or scan a sample of natural handwriting created by a person and enter, via the keyboard 106, text that the user wishes to convert into simulated handwriting. In turn, the handwriting generator application 114 generates the simulated handwriting image 120 containing the text entered via the keyboard 106 in the style of the writing in the handwriting sample image 122. The handwriting generator application 114 can employ one or more machine learning models, such as defined by an encoder-decoder convolutional neural network (CNN) or other type of deep learning neural network, as a means for extracting the style from the handwriting sample image 122 and to generate the simulated handwriting image 120.

In some embodiments, the user device 110 includes a data storage unit 118 for use in storing retrievable information, such the handwriting sample image 122 and the simulated handwriting image 120 for use with, or produced by, the handwriting generator application 114. For example, the user 101 can use the data storage unit to store images of various handwriting samples, which may have the same or different styles. The user 101 can then use the handwriting generator application 114, for example, for retrieving a handwriting sample image 122 and causing the simulated handwriting image 120 to be displayed via the display 102, printed by a printer device 102, saved to a memory (for example, storage 118), or added to a digital document. The example data storage unit 118 can include one or more tangible computer-readable media. The media can be either included in the computing device 110 or operatively coupled to the computing device 110. The data storage unit 118 can include on-board flash memory and/or one or more removable memory cards or removable flash memory.

The computing device 110 can be used to perform any of the techniques as variously described in this disclosure. For example, the system 100 of FIG. 1, or any portions thereof, and the processes of FIGS. 2, 3, 4, 5, 11 and 12, or any portions thereof, may be implemented in the system 100. The computing device 110 can include any computer system, such as a workstation, desktop computer, server, laptop, handheld computer, tablet computer (for example, the iPad® tablet computer), mobile computing or communication device (for example, the iPhone® mobile communication device, the Android™ mobile communication device, and the like), VR device or VR component (for example, headset, hand glove, camera, treadmill, and so forth) or other form of computing or telecommunications device that is capable of communication and that has sufficient processor power and memory capacity to perform the operations described in this disclosure. A distributed computational system may be provided including a plurality of such computing devices.

The data storage unit 118 includes one or more storage devices or non-transitory computer-readable media having encoded thereon one or more computer-executable instructions or software for implementing techniques as variously described in this disclosure. The storage devices may include a computer system memory or random access memory, such as a durable disk storage (which may include any suitable optical or magnetic durable storage device, for example, RAM, ROM, Flash, USB drive, or other semiconductor-based storage medium), a hard-drive, CD-ROM, or other computer readable media, for storing data and computer-readable instructions or software that implement various embodiments as taught in this disclosure. The storage devices may include other types of memory as well, or combinations thereof. The storage devices may be provided on the system 100 or provided separately or remotely from the system 100. The non-transitory computer-readable media may include, but are not limited to, one or more types of hardware memory, non-transitory tangible media (for example, one or more magnetic storage disks, one or more optical disks, one or more USB flash drives), and the like. The non-transitory computer-readable media included in the system 100 may store computer-readable and computer-executable instructions or software for implementing various embodiments.

The system 100 also includes at least one processor 116 for executing computer-readable and computer-executable instructions or software stored in data storage unit 118 or other non-transitory computer-readable media, and other programs for controlling system hardware. Virtualization may be employed in the system 100 so that infrastructure and resources in the system 100 may be shared dynamically. For example, a virtual machine may be provided to handle a process running on multiple processors so that the process appears to be using only one computing resource rather than multiple computing resources. Multiple virtual machines may also be used with one processor.

A user may interact with the system through the display or printer device 102, such as a screen, monitor, display, or printer, which may display one or more user interfaces. The display or printer device 102 may also display other aspects, elements or information or data associated with some embodiments. The system 100 may include other I/O devices 106 for receiving input from a user, for example, a keyboard, a joystick, a game controller, a pointing device (for example, a mouse, a user's finger interfacing directly with a touch-sensitive display device, and so forth), or any suitable user interface. The system 100 may include other suitable conventional I/O peripherals. The system 100 includes or is operatively coupled to various suitable devices for performing one or more of the aspects as variously described in this disclosure.

The computing device 110 can run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on computing device 110 and performing the operations described in this disclosure. In an embodiment, the operating system may be run on one or more cloud machine instances.

In other embodiments, the functional components/modules may be implemented with hardware, such as gate level logic (for example, FPGA) or a purpose-built semiconductor (for example, ASIC). Still other embodiments may be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as the imaging application 112, the handwriting generator application 114, or any combination of these, is implemented in software, such as a set of instructions (for example, HTML, XML, C, C++, object-oriented C, JavaScript®, Java®, BASIC, and so forth) encoded on any computer readable medium or computer program product (for example, hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the system 100, may be integrated into, for example, one or more desktop or laptop computers, workstations, tablets, smart phones, game consoles, set-top boxes, or other such computing devices. Other componentry and modules typical of a computing system, such as processors (for example, central processing unit and co-processor, graphics processor, and so forth), input devices (for example, keyboard, mouse, touch pad, touch screen, and so forth), and operating system, are not shown but will be apparent.

Process Overview

Embodiments of the present disclosure are directed to techniques for training machine learning models using one or more images of one or more handwriting samples. Further embodiments are directed to techniques for producing an image of simulated handwriting in the same style as the handwriting sample based on a coded text input. The coded text input can be of arbitrary and variable length (for example, Unicode characters according to The Unicode Standard 12.1 or earlier). The simulated handwriting image can be produced using the machine learning models and, in some cases, one or more post-processing functions. The handwriting sample can include individual letters, words, phrases, and sentences or partial sentences, including, for example, a line of writing. The style of the handwriting sample is defined as a function of the shape and spacing of the handwritten letters and can be represented by a numeric vector in the machine learning models.

In some embodiments, the machine learning models can be used with handwritten text recognition (HTR) models to discriminate between different styles of handwriting samples. For example, the style of a handwriting sample can be compared against other pre-learned styles to predict which pre-learned style most closely matches the style of the sample. This is useful for determining authorship or forgery of a handwritten document.

Figure 2:
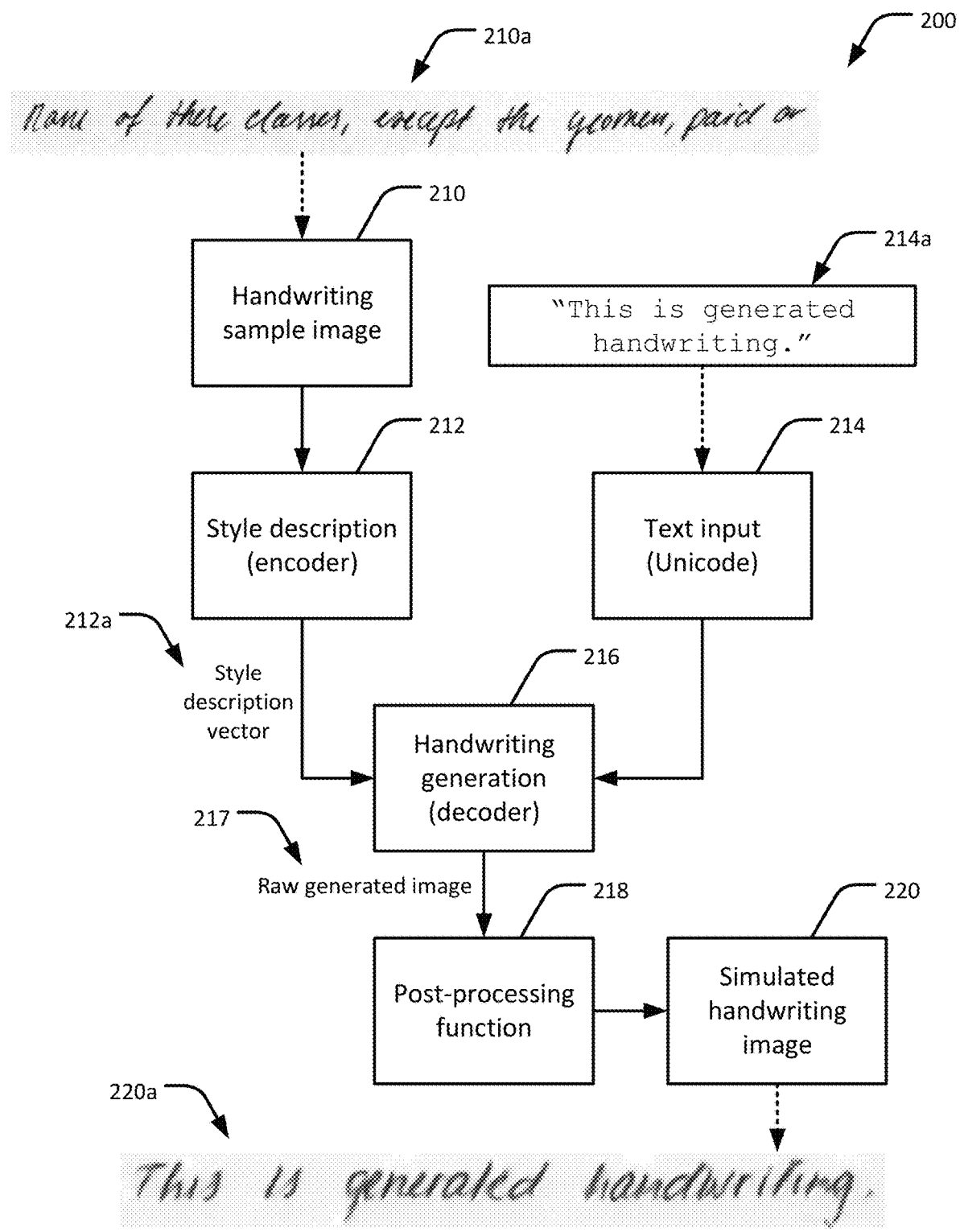
FIG. 2 is a flow diagram of an example process for generating a digital image of simulated handwriting, in accordance with an embodiment of the present disclosure.

FIG. 2 is a flow diagram of an example process 200 for generating a digital image of simulated handwriting, in accordance with an embodiment of the present disclosure.

The process 200 can be implemented, for example, by the system 100 of FIG. 1. The process 200 has two inputs 210, 214 and one output 220. The inputs include an image of a handwriting sample 210 and a variable length coded text input 214. The text in the handwriting sample image 210 can be different from the coded text input 214. The output includes an image of simulated handwriting 220 of the coded text input 214.

To generate the output, the process 200 includes using a set of models with an encoder-decoder structure 1) to extract a style description from the handwriting sample image 210, and 2) to generate the simulated handwriting image 220 based on the extracted style description and the coded text input 214. The encoder-decoder structure includes one or more deep learning neural networks trained to generate images of simulated handwriting from one or more handwriting samples without knowledge or use of any glyphs, fonts or typefaces, and without directly reproducing or copying any portion of the handwriting sample images. Generally, the encoder is configured to map the simulated handwriting image 220 to the style description, and the decoder is configured to generate the simulated handwriting image 220 from the style description and the coded text input 214, although it will be understood that one or more additional steps can be performed in some embodiments. In some embodiments, the neural network models are autoregressive during training of the encoder-decoder structure, meaning that the models can consume previously generated style descriptions and/or previously generated simulated handwriting images 220 as further inputs when generating new simulated handwriting images 220.

An example handwriting sample image 210a, shown in FIG. 2, includes a handwritten phrase "none of these classes, except the yeomen, pair or," although it will be understood that the handwriting sample image 210a can include any sequence of letters or words. As can be seen in the example image 210a, the handwriting sample has a natural appearance and includes a variety of letters and words. The handwriting sample image 210 can be obtained, for example, by scanning or photographing the handwriting sample image 210a into a digital image format, such as JPEG, GIF, bitmap, raw image, TIFF, PDF, or other suitable format. For example, the handwriting sample image 210 can include a grayscale image having minimum and maximum inverted-luminance, where −1 is pure white and +1 is pure black. For example, the background (such as paper) is represented by an input grayscale level of or near −1 and the ink (the writing) is represented by an input grayscale level of or near +1 within a height of about 64 pixels. The pixel height can be adjusted, for example, to fully extend across the height of a single line of text in the handwriting sample image 210.

A neural network modeled as an encoder, referred to as a style extractor 212, processes the handwriting sample 210 to produce a style description, which is represented by a style description vector 212a. The style description vector 212a is a feature vector produced by the encoder 212 with a unique, latent embedded representation of the handwriting in the sample 210. The style description vector 212a can include any number of values, for example, 256 real/floating point numbers. In some embodiments, the style description vector 212a is a concatenation of a neural global pooling function vector and a neural attention function vector, described in further detail with respect to FIG. 3. The use of global pooling and attention functions, in some embodiments, permits the style description to be extracted from arbitrarily long input images by focusing on a subset of the input features.

A neural network modeled as a decoder, referred to as a handwriting generator 216, provides a means for processing the coded text input 214 to produce a raw generated image 217. In some embodiments, the raw generated image 217 can be produced using an input mask for spacing and positioning of each letter in the simulated handwriting image 220, which improves the quality of the result. In some embodiments, the handwriting generation process further includes using a post-processing function 218 to improve the quality of the raw generated image 217. The post-processing function 218 can be used to introduce a variety of realistic background noises and textures to improve the appearance of the simulated handwriting (for example, a Cycle Generative Adversarial Network or CycleGAN). An example coded text input 214a, shown in FIG. 2, includes a coded text phrase "This is generated handwriting." An example simulated handwriting image 220a, shown in FIG. 2, includes a simulated handwritten phrase "This is generated handwriting." As can be seen, the content of the simulated handwriting image 220a is the coded text input 214a rendered in the style of the handwriting sample image 210a. As will be appreciated, the coded text input 214a can be any textual content that is to be converted into simulated handwriting. The coded text input 214a can be, for example, a signature, a sentence or paragraph of writing, a note or annotation, editorial comments, or any other type of textual content that can be converted into simulated handwriting.

Style Extractor

Figure 3:
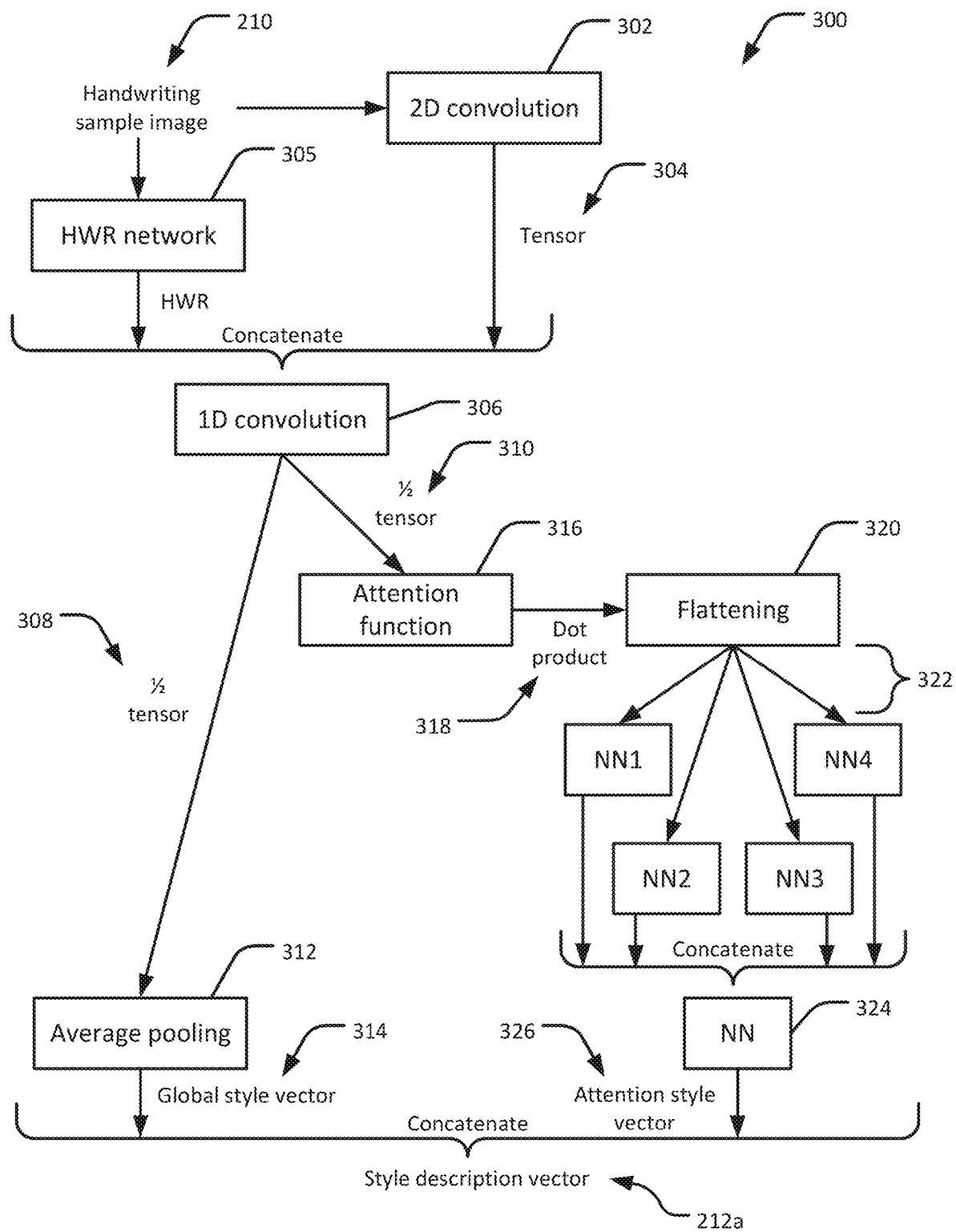
FIG. 3 is a block diagram of an example neural network that can be trained as a style extractor for extracting a style from an image of a given handwriting sample, in accordance with an embodiment of the present disclosure.

FIG. 3 is a block diagram of an example of a neural network 300 that can be trained as a style extractor 212 as a means for extracting a style from an image of a given handwriting sample, in accordance with an embodiment of the present disclosure. Generally, the neural network 300 is trained to map examples of inputs, such as the handwriting sample image 210, to outputs, such as the style description vector 212a, via layers of nodes. Each node is assigned a weight. For a given node, the inputs are multiplied by the weights in the node and summed together. This value is referred to as the summed activation of the node. The summed activation is then transformed via an activation function, which defines the specific output of the node. A node that implements this activation function is referred to, in some embodiments, as a rectified linear activation unit ("ReLU").

In some embodiments, the means for extracting the style description vector from the image of a handwriting sample employs a neural network. For example, in some such embodiments, the neural network includes an encoder-decoder convolutional neural network (CNN), such as the convolutional network described with respect to FIGS. 2 and 3. In the encoder-decoder CNN, the encoder is configured to map the simulated handwriting image 220 to the style description vector 212a, and the decoder is configured to generate the simulated handwriting image 220 from the style description vector 212a and the coded text input 214, although it will be understood that one or more additional or alternate steps can be performed in some embodiments. However, it will be appreciated that other types of deep learning neural networks (other than CNN) can be used to extract the style description, and that the neural network does not necessarily include an encoder-decoder structure. For example, the neural network can be constructed as a deep neural network (DNN), which models the feedforward relationship from the simulated handwriting image 220 to the style description vector 212a and the coded text input 214. In another example, the neural network can be constructed as a recurrent neural network (RNN), which models the multipath relationships between the simulated handwriting image 220, the style description vector 212a, and the coded text input 214. Other examples will be apparent in view of this disclosure.

In some other embodiments, the means for extracting the style description vector includes an attention function applied to at least a portion of the image of the handwriting sample, such as described with respect to FIG. 2. The use of attention functions, in some embodiments, permits the style description to be extracted from arbitrarily long input images by focusing on a subset of the input features. However, it will be understood that the attention function is not necessary in all cases. For example, the style description vector can be extracted from the image of the handwriting sample using a pooling function (or other suitable function) when the image is relatively small or a fixed sized.

In some embodiments, the style description is defined by a numeric style vector. The numeric style vector is produced from the handwriting sample image 210 using a sequence of processes such as shown in FIG. 3. First, the handwriting sample image 210 is processed through a convolutional network 302. In the convolutional network 302, the sample image 210 is processed through one or more filters, or layers, to learn the characteristics of different portions of the handwriting sample image 210, such as portions that include writing or ink. For example, if the handwriting sample image 210 is a grayscale image where the background (such as paper) is represented by an input grayscale level of or near −1 and the ink (text) is represented by an input grayscale level of or near +1, then a 2D convolution can be used to map the ink (text) regions to an output image. Each convolution layer is followed by a group normalization, a ReLU, and a dropout to prevent overfitting. The output of the convolution network 302 has a height of one. An example 2D convolutional network 302 can be defined as follows:

| Output Channels | Kernel | Stride | Padding (horz, vert) |
|---|---|---|---|
| 64 | 5 × 5 | 1 | 2, 2 |
| 128 | 4 × 4 | 2 | 1, 1 |
| 128 | 3 × 3 | 1 | 1, 0 |
| 256 | 4 × 4 | 2 | 1, 1 |
| 256 | 3 × 3 | 1 | 1, 0 |

The output of the convolutional network 302 is then reduced to a tensor 304 with one spatial dimension. The tensor 304 is concatenated channel-wise with the output of a pretrained handwriting recognition (HWR) network 305 run on the same handwriting sample image 210 as the convolutional network 302. The resulting tensor has 256+C channels, where C is the number of character classes. The tensor then passes through a one-dimensional ("1D") convolutional network 306. An example 1D convolutional network 306 can be defined as follows:

| Layer | Out Channels | Kernel | Stride | Padding |
|---|---|---|---|---|
| Conv | 256 | 5 | 1 | 2 |
| ReLU | — | — | — | — |
| MaxPool | — | 2 | 2 | 0 |

| Layer | Out Channels | Kernel | Stride | Padding |
|---|---|---|---|---|
| Conv | 256 | 3 | 1 | 1 |
| ReLU | — | — | — | — |
| Conv | 256 | 3 | 1 | 1 |

The output of the convolutional network 306 is then split into two halves (308, 310) channel-wise with 128 channels each. An average pooling 312 is performed on one half of the output 308, resulting in a global style vector 314 having 128 components. A multi-dot product attention function 316 is performed on the other half of the output 310, using four heads. The queries in the attention function are 64 fixed vectors of length 128 that are learned during training. The result of the dot product attention is a dot product 318 having 64×128 (queries×channels), which is flattened 320 to 8,192 channels. The flattened channels are split into four tensors 322 of 2,048 channels each. Each of the four tensors 322 is run through a small network NN1, NN2, NN3, NN4, each defined as LeakyReLU(0.2), Linear layer (2048 to 128), Dropout (0.01), and LeakyReLU(0.01). The results of these four networks NN1, NN2, NN3, NN4 are concatenated channel-wise, with a resulting size of 512. The result of the concatenation is passed through another small network 324, defined as Linear layer (512 to 256), Dropout (0.01), LeakyReLU(0.01), and Linear layer (256 to 128). The output of the network 324 is an attention style vector 326 with 128 components.

The final style description vector 212*a* is a concatenation of the global style vector 314 and the attention style vector 326, with 256 components. The style description vector 212*a* is then fed as an input to the handwriting generator 216.

Handwriting Generator

Figure 4:
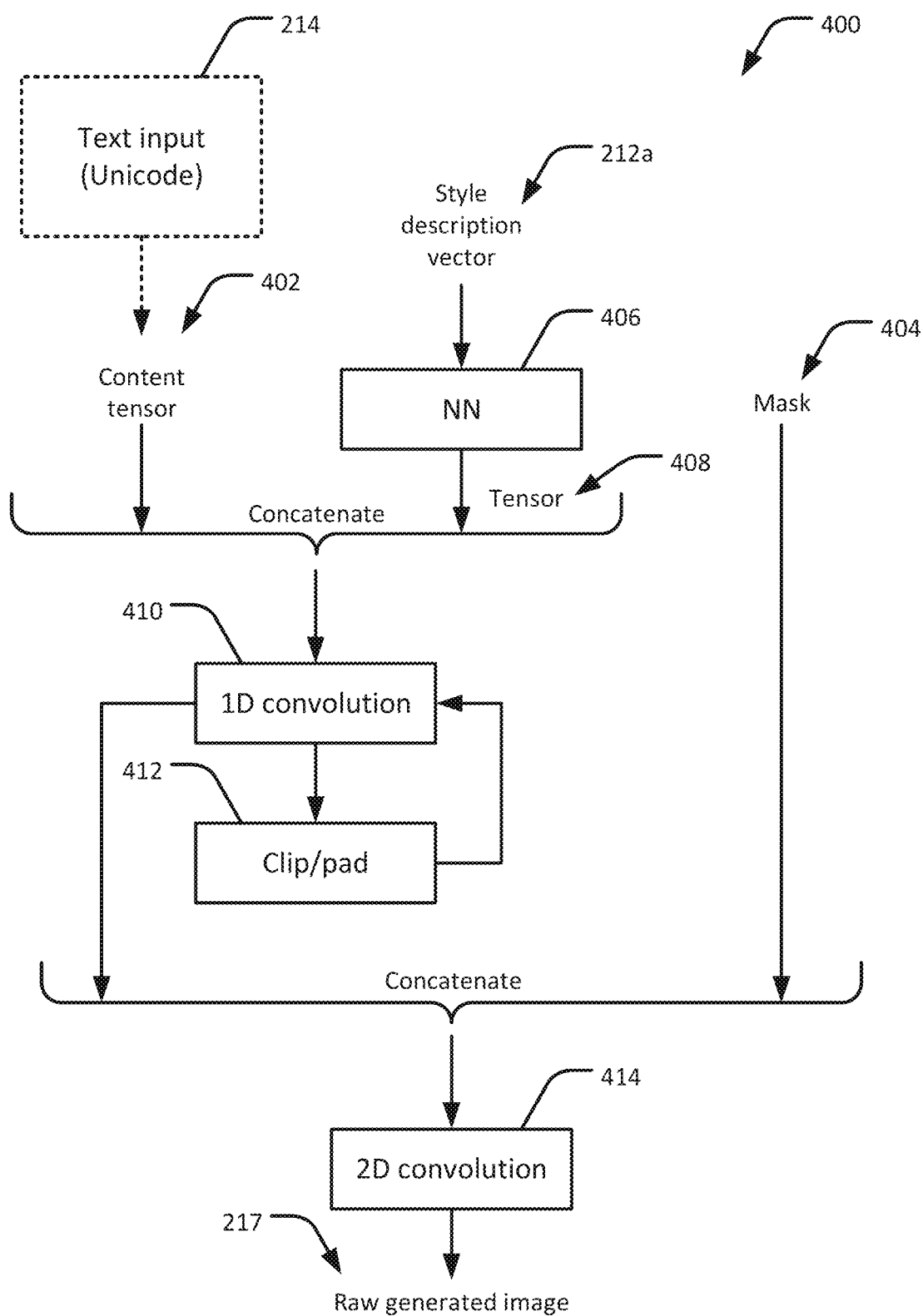
FIG. 4 a block diagram of an example neural network that can be trained as a handwriting generator for generating a digital image of simulated handwriting, in accordance with an embodiment of the present disclosure.

FIG. 4 is a block diagram of an example of a neural network 400 that can be trained as the handwriting generator 216 as a means for generating a digital image of simulated handwriting, in accordance with an embodiment of the present disclosure. The neural network 400 is trained to map examples of inputs to outputs via layers of nodes. The handwriting generator 400 receives three inputs: a content tensor 402, the style description vector 212*a*, and an input mask 404. The content tensor 402 is a one-hot encoding (single high bit) of characters in the coded text input 214, including blanks for horizontal spacing. The input mask 404 represents a region of the simulated handwriting image 220 where the characters are to be rendered. The input mask 404 has one channel (−1 is off, 1 is on) that is the size of the desired output image (for example, 64×W). The style vector 212*a* is used to set parameters for an adaptive instance normalization (AdaIN) layer of a small neural network 406 defined as Linear (256 to 144), ReLU, and Linear (144 to 32). The result 408 is repeated (tiled) spatially to match the size of the content tensor 402, and then concatenated channel-wise to the content tensor 402.

The concatenated tensor is passed through a 1D convolutional network 410. An example 1D convolutional network 410 can be defined as follows:

| Transpose | Channels Out | Kernel | Stride | Padding | Norm | Activation |
|---|---|---|---|---|---|---|
| Yes | 128 | 3 | 1 | 1 | None | ReLU |
| Yes | 128 | 3 | 1 | 1 | AdaIN | ReLU |
| Yes | 64 | 4 | 2 | 1 | AdaIN | ReLU |
| Yes | 64 | 4 | 2 | 1 | AdaIN | ReLU |
| No | 64 | 3 | 1 | 2 | None | ReLU |

The result of the convolution is clipped off the right end or padded 412 to have the same width as the mask 404. The convolution 410 is then repeated, tiled and expanded to have the same height as the mask 404. This result is then concatenated with the input mask channel-wise. The concatenated result is then passed through a 2D convolutional network 414. An example 2D convolutional network 414 can be defined as follows:

| Type | Channels Out | Kernel | Stride | Padding | Norm | Activation |
|---|---|---|---|---|---|---|
| Conv | 128 | 3 × 3 | 1 | 1 | AdaIN | ReLU |
| Conv | 256 | 4 × 4 | 2 | 1 | AdaIN | ReLU |
| Conv | 512 | 4 × 4 | 2 | 1 | AdaIN | ReLU |
| ResBlock, 2 Layers | 512 | 3 × 3 | 1 | 1 | AdaIN | ReLU |
| Transpose Conv | 256 | 4 × 4 | 2 | 1 | AdaIN | ReLU |
| ResBlock, 3 Layers | 256 | 3 × 3 | 1 | 1 | AdaIN | ReLU |
| Transpose Conv | 128 | 4 × 4 | 2 | 1 | AdaIN | ReLU |
| ResBlock, 2 Layers | 128 | 3 × 3 | 1 | 1 | AdaIN | ReLU |
| Conv | 1 | 5 × 5 | 1 | 2 | None | tanh |

The ResBlocks are residual blocks with the given number of layers. The result of the 2D convolutional network 414 is the raw generated image 217 of the simulated handwriting of the text input 214.

In some embodiments, the means for generating the simulated handwriting image employs a neural network. For example, in some such embodiments, the neural network includes an encoder-decoder convolutional neural network (CNN), such as the convolutional network described with respect to FIGS. 2 and 3. In the encoder-decoder CNN, the encoder is configured to map the simulated handwriting image 220 to the style description vector 212*a*, and the decoder is configured to generate the simulated handwriting image 220 from the style description vector 212*a* and the coded text input 214, although it will be understood that one or more additional or alternate steps can be performed in some embodiments. However, it will be appreciated that other types of deep learning neural networks (other than CNN) can be used to extract the style description, and that the neural network does not necessarily include an encoder-decoder structure. For example, the neural network can be constructed as a deep neural network (DNN), which models the feedforward relationship from the simulated handwriting image 220 to the style description vector 212*a* and the coded text input 214. In another example, the neural network can be constructed as a recurrent neural network (RNN), which models the which models the multipath relationships between the simulated handwriting image 220, the style description vector 212*a*, and the coded text input 214. Other examples will be apparent in view of this disclosure.

In some embodiments, the means for generating the simulated handwriting image is based, at least in part, on a predicted width of characters in the simulated handwriting image, a predicted spacing of the characters in the simulated handwriting image, and an input mask. For example, predicted width and/or spacing of the characters and the style description vector are fed into a mask generator RNN, which predictively models the spacing (number of pixels) above and below an arbitrary centerline of the mask. The input mask defines a predicted region where the characters are to be rendered in the simulated handwriting image. However, it will be understood that the mask is not necessary in all cases. For example, a fixed mask (or no mask) could be used instead of the generated mask described above.

Figure 5:
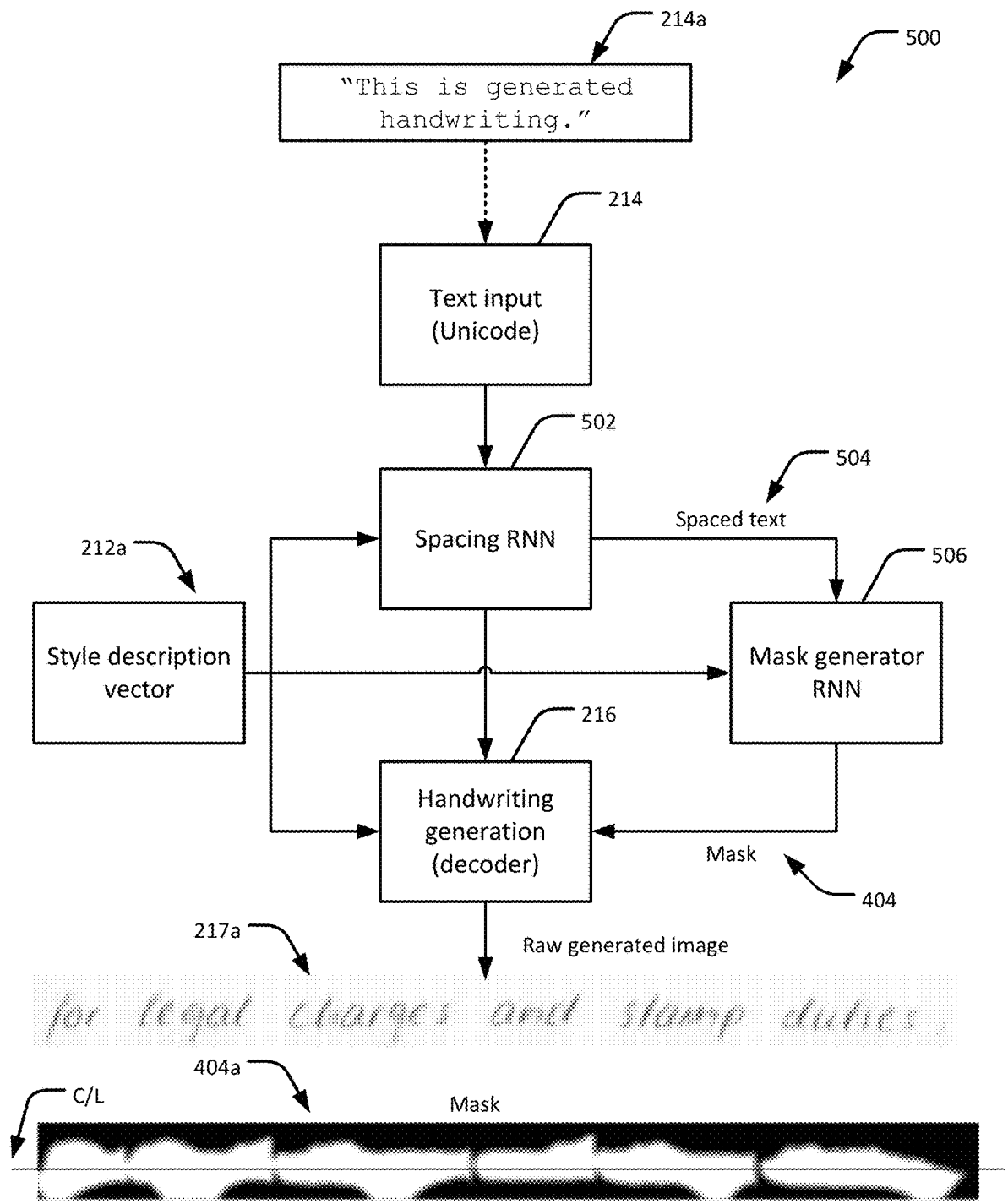
FIG. 5 is a block diagram of an example process that can be implemented with the handwriting generator of FIG. 4, in accordance with an embodiment of the present disclosure.

FIG. 5 is an example of a process 500 that can be implemented as the handwriting generator 216, in accordance with an embodiment of the present disclosure. To improve performance of the handwriting generator 216, additional information about the spacing and positioning of letters is incorporated into the encoder-decoder models. This information can be used to predict the horizontal and vertical spacing and alignment of the letters in the simulated handwriting image 220 based on the coded text input 214 and the style description vector 212a.

The coded text input 214 and the style description vector 212a are fed into a spacing recurrent neural network (RNN) 502, which predictively models the horizontal spacing between the characters in the simulated handwriting image 220. The spacing RNN 502 receives as an input a one-hot encoding of the variable length coded text input 512 concatenated with the style description vector 212a, which is tiled over a one-dimensional space. Recall that the style description vector 212a is a representation of the handwriting sample image 210, and thus the spacing RNN 502 is trained on such sample images. The RNN model includes a two-layer, bidirectional gated recurrent unit ("GRU"), which is similar to a long short-term memory gate and provides temporal connections for use in the handwriting generator 216. The GRU has a hidden size of 128 and a dropout of 0.25, followed by a linear layer (256 to 2). The results are multiplied and summed with learned values, including a standard deviation and mean for each predicted value, to produce a Connectionist Temporal Classification (CTC) spaced text output 504, such as used for handwriting recognition in certain embodiments. The spaced text output 504 predicts the number of blanks (spaces) preceding each character, how many times the character should be repeated, and the probability of the horizontal position and alignment of all characters in the output image representing a line of writing.

The spaced text output 504 and the style description vector 212a are fed into a mask generator RNN 506, which predictively models the spacing (number of pixels) above and below an arbitrary centerline (C/L) of the mask 404. The input mask 404 has one channel (−1 is off, 1 is on) that is the size of the desired output image (for example, 64×W), which defines the region of the output image that includes the characters of the simulated handwriting, and more particularly, the vertical alignment of the characters in a line of writing. Use of the mask 404 to position and align the simulated writing produces more realistic results that mimic real handwriting.

The mask generator RNN 506 receives as an input a one-hot encoding of the coded text input 512 (with blanks) concatenated to the style description vector 212a, which is tiled over a one-dimensional space. The RNN model includes a two-layer, bidirectional gated recurrent unit ("GRU"), which provides temporal connections for use in the handwriting generator 216. The GRU has a hidden size of 128 and a dropout of 0.25. The model is then passed through a small upsampling 1D convolutional network, which can be defined as follows:

| Type | Channels Out | Kernel | Stride | Padding | Norm | Activation |
|---|---|---|---|---|---|---|
| Transpose Conv | 128 | 4 | 2 | 0 | Group | ReLU |
| Transpose Conv | 64 | 4 | 2 | 0 | Group | ReLU |

The result of the 1D convolution is passed through another two-layer, bidirectional GRU with a hidden size of 64 and 0.25 dropout, and then through a line layer (128 to 2). The results are then multiplied and summed with learned values, including a standard deviation and mean for each predicted value. The output of the mask generator 506 is the mask 404, which can have a centerline (C/L) passing through any point in the mask 404. As can be seen in an example mask 404a of FIG. 5, the white portions represent the approximate area where the simulated handwriting is vertically centered across the width of the image (compare, for example, the mask 404a with the spacing and centering of text in an example raw generated image 217a).

FIGS. 6, 7, and 8 each shows an example image of actual handwriting as well as a corresponding example image of simulated handwriting that can be produced based on the actual image, in accordance with an embodiment of the present disclosure. Each example includes an input handwriting sample image, which can be included in the handwriting sample image 210 of process 200, and an output simulated handwriting image, which can be included in the simulated handwriting image 220 of process 200. Note that the writing of the input is not necessarily the same as the writing of the output. However, the style of the handwriting of the output mimics the style of the handwriting of the input.

FIG. 9 shows several examples of the raw generated images 217 that can be generated by the process 200, in accordance with various embodiments of the present disclosure. Each line of text in FIG. 9 is a generated image before post-processing. The images are grouped by style (for clarity, not all styles are called-out in FIG. 9). Although the text in each line of simulated handwriting is different, the letters share similar handwriting styles within each group.

Post-Processing Example

Referring again to FIG. 2, in some embodiments a post-processing function 218 is a feed-forward network that takes the raw generated image 217 and outputs a more refined generated image. The post-processing function 218 can be performed, for example, by the system 100 of FIG. 1. The post-processing can be used to introduce a variety of more realistic background noises and textures to improve the appearance of the simulated handwriting. For example, the post-processing function 218 could be learned as a part of a Cycle Generative Adversarial Network (CycleGAN) image translation model. CycleGAN learns two functions, the first translating images from the raw generated domain to the real sample domain, the second translating images from the real sample domain to the raw generated domain. Each of these functions are supervised by two losses. The first is an adversarial loss, where each translation model is optimized in a zero-sum game with an auxiliary discriminating model, causing the respective function to create outputs looking more similar to its target output domain. The second loss is a cyclic consistency which encourages the compositions of the two translation functions to be close to an identity function. During training it alternatively translates a generated image 217 to the real sample domain and back to the generated domain by the two functions, and then translates a sample image 210 (possibly not the one used to generate the previous generated image 217) to the generated domain and then back to the real sample domain using the functions in reverse order, applying the losses on both cases. The resulting function trained to translate images from the generated domain to real sample domain is used as the post-processing 218. The post-processing 218 improves the ability of the handwriting generator 216 to generate output simulated handwriting images that mimic the style of handwriting in the input image and are crisper and more realistic than the raw generated image 217.

In some embodiments, a means for applying a post-processing function to the raw generated image is used to produce the simulated handwriting image. The post-processing means can include, for example, the feed-forward network described above. However, other post-processing techniques can be used in addition to or instead of the feed-forward network. In general, any suitable technique for introducing a variety of more realistic background noises and textures can be used to improve the appearance of the simulated handwriting. Other techniques can be used during training to translate a generated image between domains, and a variety of different losses can be applied, such as pyramidal L1 losses, perceptual losses, connectionist temporal classification (CTC) losses, and/or adversarial losses.

FIG. 10 shows several examples of raw generated images 217 and simulated handwriting images 220 after post-processing 218. In each example, the first line of writing is the raw generated image 217 and the second line of writing is after post-processing (for clarity, not all lines are called-out in FIG. 10). As can be seen in FIG. 10, the post-processing can increase the sharpness, contrast, and/or clarity of the simulated handwriting.

Training Example

Figure 11:
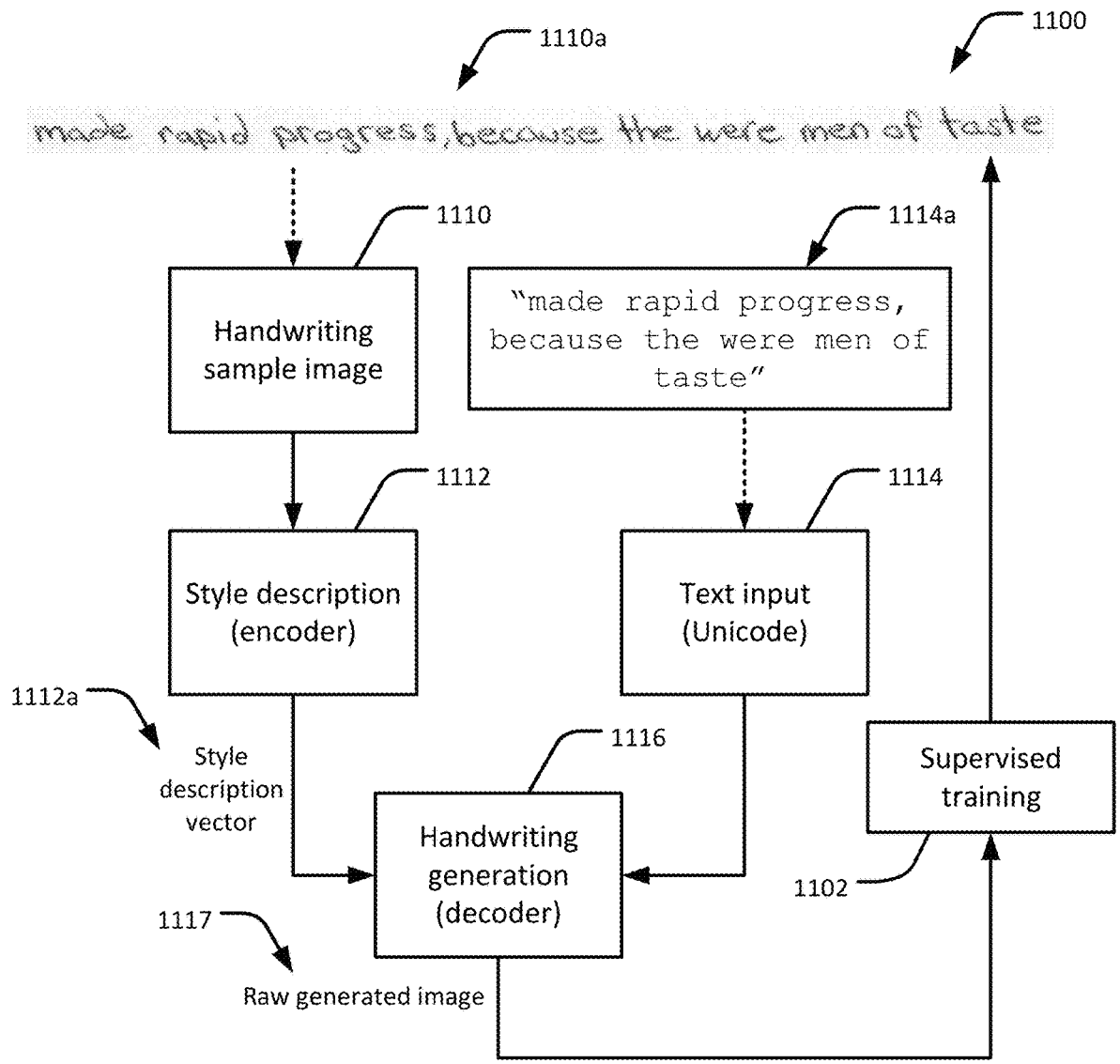
FIG. 11 is a flow diagram of an example process for training a deep learning neural network system to generate a digital image of simulated handwriting, in accordance with an embodiment of the present disclosure.

FIG. 11 is a flow diagram of an example process 1100 for training a deep learning neural network system to generate a digital image of simulated handwriting, in accordance with an embodiment of the present disclosure. The process 1100 can be implemented, for example, by the system 100 of FIG. 1. The process 1100 has two inputs 1110, 1114 and one output 1117. The inputs include a handwriting sample image 1110 and a variable length coded text input 1114. The writing in the sample 1110 is the same as the coded text input 1114 to supervise the training. The output includes a raw generated image 1117 of the coded text input 1114. To generate the output, the process 1100 includes using a set of models with an encoder-decoder structure configured to extract a style description from the handwriting sample 1110 and to generate the raw generated image 1117 based on the style description and the coded text input 1114. The encoder-decoder structure includes one or more deep learning neural networks that are trained to generate images of simulated handwriting from the handwriting samples and without knowledge or use of any glyphs, fonts or typefaces, and without reproducing any portion of the sample image. Generally, the encoder maps an input, such as the handwriting sample image 1110, to the style description, and the decoder generates an output, such as the raw generated image 1117, from the style description and the coded text input 1114. In some embodiments, the models are auto-regressive during training of the encoder-decoder structure, meaning that the models consume the previously generated style descriptions and/or the previously generated outputs as further inputs when generating new outputs.

An example handwriting sample image 1110*a*, shown in FIG. 11, includes a handwritten phrase "made rapid progress, because the were men of taste". As can be seen in the example image 1110*a*, the handwriting has a natural appearance. The handwriting sample image 1110 can be obtained, for example, by scanning or photographing the handwriting into a digital image format, such as JPEG, GIF, bitmap, raw image, TIFF, PDF, or other suitable format. For example, the handwriting sample image 1110 can be a grayscale image, where the background (paper) is represented by an input grayscale level of or near −1 and the ink is represented by an input grayscale level of or near +1 within a height of about 64 pixels. The pixel height can be adjusted, for example, to fully extend across the height of a single line of text in the handwriting sample image.

A neural network modeled as an encoder, referred to as a style extractor 1112, provides a means for processing the handwriting sample 1110 to produce a style description, which is represented by a style description vector 1112*a*. The style description vector 1112*a* is a feature vector produced by the encoder 1112 with a unique, latent embedded representation of the handwriting in the sample 1110. In some embodiments, the style description vector 1112*a* is a concatenation of a neural global pooling function vector and a neural attention function vector, described in further detail with respect to FIG. 3. The use of global pooling and attention functions permits the style extractor to operate on arbitrarily long input images by focusing on a subset of the input features.

A neural network modeled as a decoder, referred to as a handwriting generator 1116, provides a means for processing the coded text input 1114 to produce a raw generated image 1117. In some embodiments, the handwriting generation process further includes using a post-processing function 1118 to improve the quality of the raw generated image 1117.

In this example, the text input 1114 includes the same words as the handwriting sample image 1110, and thus the output raw generated image 1117 will appear similar to the handwriting sample image 1110. The output raw generated image 1117 can then be passed through supervised training 1102 of the encoder 1112 and decoder 1116. The supervised training 1102 performs a pixel-by-pixel comparison to determine the differences between the handwriting sample image 1110 and the raw generated image 1117. The encoder-decoder models are then optimized by minimizing the supervised pyramid L1 (Least Absolute Deviations) losses in the differences. An L1 loss function minimizes the error defined as a sum of all the absolute differences between the inputs (ground truths) and the outputs (predictions).

Each pyramid loss is a normalized L1 distance between a prediction of the generated handwriting image 1117 and the corresponding handwriting sample image 1110. In some embodiments, the handwriting generator 1116 is trained using handwriting recognition model (HWR). The HWR model predicts the text present in the generated image 1117 and error in the text (compared to the text 1114 passed to the decoder) is fed back into the handwriting generator 1116 as a training signal. In some embodiments, the handwriting generator 1116 is trained using an adversarial method, where a separate discriminative model is trained to predict whether its input is a real image or a generated image (using examples of 1110*a* and 1117). The discriminator then predicts on a generated image 1117 and its success supervises the decoder 1116 in manner that decoder will create images more likely to elicit a real image (incorrect) prediction by the discriminator. The supervised training 1102 can be repeated for a training set including any number of samples 1110, for example, hundreds, thousands, tens of thousands, hundreds of thousands, and so forth, repeating these samples any number of times.

Example Methodology

Figure 12:
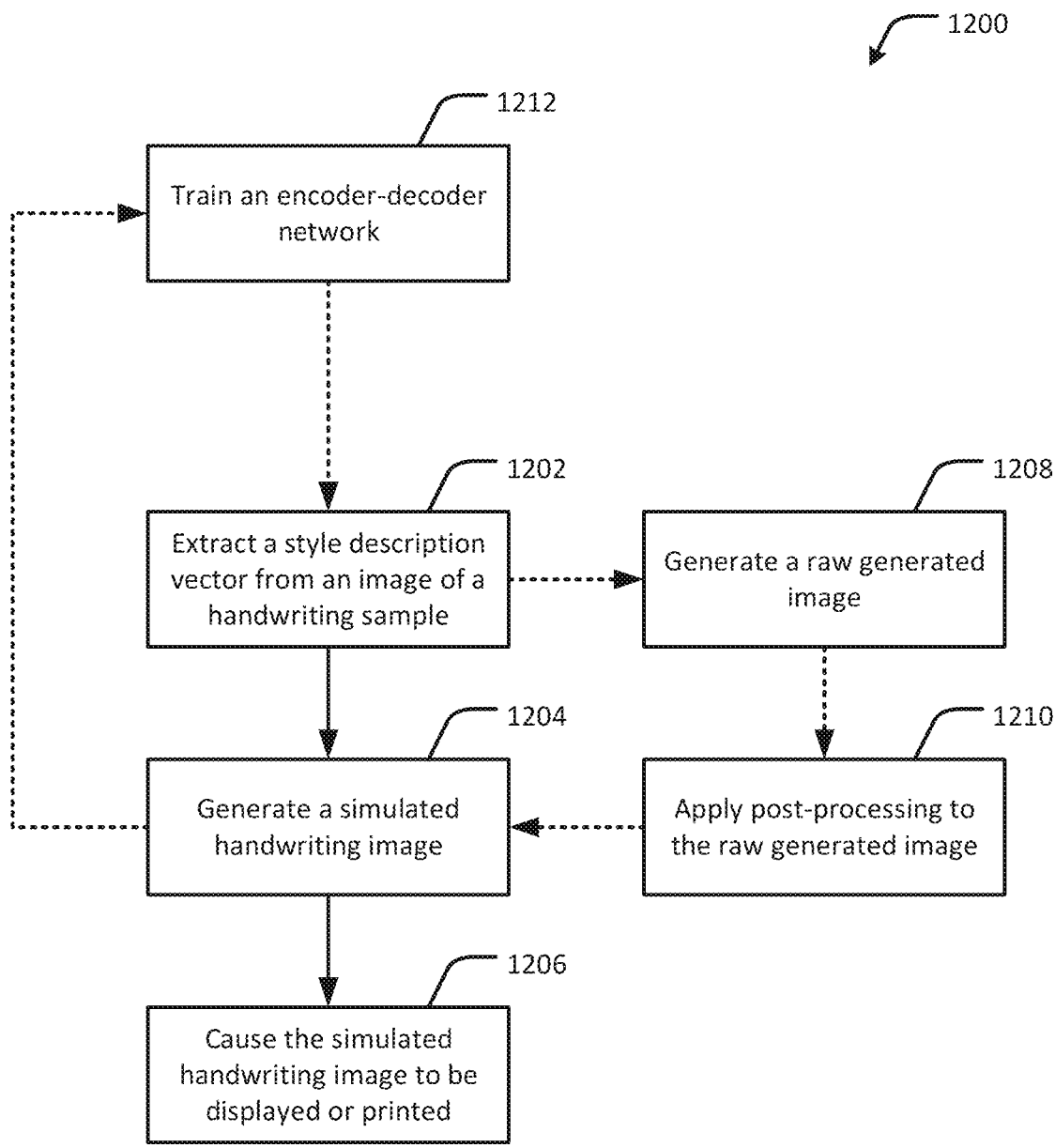
FIG. 12 shows a flow diagram of an example process for generating a digital image of simulated handwriting, in accordance with an embodiment of the present disclosure.

FIG. 12 shows a flow diagram of an example process 1200 for generating a digital image of simulated handwriting. The process 1200 can be implemented, for example, in the system 100 of FIG. 1. The process 1200 includes extracting 1202, using an encoder-decoder neural network, a style description vector from a handwriting sample image, such as described with respect to FIG. 2. The style description vector represents a style of a first sequence of letters or words in at least a portion of the image of the handwriting sample. As described above, the style of the letters or words in the handwriting sample represents the distinctive visual appearance of the handwriting. Different handwriting can be represented by different styles, and the similarity of styles can be measured by a distance between the corresponding style description vectors.

The process 1200 further includes generating 1204, using the encoder-decoder neural network, an image of simulated handwriting based on the style description vector and a variable length coded text input having a second sequence of letters or words, such as described with respect to FIG. 2. The coded text input can include, in some embodiments, one or more Unicode characters. The simulated handwriting image contains the second sequence of letters or words in the style of the first sequence of letters or words. In other words, the simulated handwriting image can contain different letters or words than those in the handwriting sample image, or it can contain the same letters or words as in the handwriting sample image. However, the distinctive visual appearance of the letters or words in the simulated handwriting image mimics the visual appearance of the letters or words in the handwriting sample image, even if the letters or words are different. The process 1200 further includes causing 1206 the simulated handwriting image to be displayed on a display, added to a digital document, saved to a memory, printed by a printer, and/or otherwise manifested in a tangible or visible format for viewing by a human.

In some embodiments, the process 1200 includes generating 1208, using the encoder-decoder neural network, a raw generated image based on the style description vector and the coded text input and applying 1210 a post-processing function to the raw generated image to produce the simulated handwriting image. In some cases, the post-processing function includes a Cycle Generative Adversarial Network (CycleGAN) image translation model, such as described with respect to FIG. 2.

In some embodiments, the generating 1204, using the encoder-decoder neural network, the simulated handwriting image is further based on a predicted width of characters in the simulated handwriting image, a predicted spacing of the characters in the simulated handwriting image, and an input mask, the input mask defining a predicted region where the characters are to be rendered in the simulated handwriting image.

In some embodiments, the process 1200 includes comprising training 1212 the encoder-decoder neural network using the simulated handwriting image and a handwritten text recognition (HTR) model trained using one or more different images of handwriting samples, such as described with respect to FIG. 11.

ADDITIONAL EXAMPLES

Numerous embodiments will be apparent in light of the present disclosure, and features described herein can be combined in any number of configurations. One example embodiment provides a computer-implemented method for simulating handwriting. The method includes extracting, by at least one processor using a neural network, a style description vector from an image of a handwriting sample, the style description vector representing a style of a first sequence of letters or words in at least a portion of the image of the handwriting sample; generating, by the at least one processor using the neural network, an image of simulated handwriting based on the style description vector and a variable length coded text input having a second sequence of letters or words, the image of simulated handwriting containing the second sequence of letters or words in the style of the first sequence of letters or words; and causing, by the at least one processor, the image of simulated handwriting to be one or more of displayed on a display, added to a digital document, saved to a memory, or printed by a printer. In some cases, the method includes generating, by the at least one processor using the neural network, a raw generated image based on the style description vector and the variable length coded text input; and applying, by the at least one processor, a post-processing function to the raw generated image to produce the image of simulated handwriting. In some such cases, the post-processing function includes a Cycle Generative Adversarial Network (CycleGAN) image translation model. In some cases, generating the image of simulated handwriting is further based on a predicted width of characters in the image of simulated handwriting, a predicted spacing of the characters in the image of simulated handwriting, and an input mask, the input mask defining a predicted region where the characters are to be rendered in the image of simulated handwriting. In some cases, the method includes training, by the at least one processor, the neural network using the image of simulated handwriting and a handwritten text recognition (HTR) model trained using one or more different images of handwriting samples. In some cases, the first sequence of letters or words are different from the second sequence of letters or words. In some cases, the variable length coded text input includes one or more Unicode characters.

Another example embodiment provides a computer program product including one or more non-transitory machine-readable mediums having instructions encoded thereon that when executed by at least one processor cause a process to be carried out for simulating handwriting. The process includes extracting, using an encoder-decoder neural network, a style description vector from an image of a handwriting sample, the style description vector representing a style of a first sequence of letters or words in at least a portion of the image of the handwriting sample; generating, using the encoder-decoder neural network, an image of simulated handwriting based on the style description vector and a variable length coded text input having a second sequence of letters or words, the image of simulated handwriting containing the second sequence of letters or words in the style of the first sequence of letters or words; and causing the image of simulated handwriting to be one or more of displayed on a display, added to a digital document, saved to a memory, or printed by a printer. In some cases, the process includes generating, using the encoder-decoder neural network, a raw generated image based on the style description vector and the coded text input; and applying, by the at least one processor, a post-processing function to the raw generated image to produce the image of simulated handwriting. In some such cases, the post-processing function includes a Cycle Generative Adversarial Network (CycleGAN) image translation model. In some cases, the generating of the image of simulated handwriting is further based on a predicted width of characters in the image of simulated handwriting, a predicted spacing of the characters in the image of simulated handwriting, and an input mask, the input mask defining a predicted region where the characters are to be rendered in the image of simulated handwriting. In some cases, the process includes training the encoder-decoder neural network using the image of simulated handwriting and a handwritten text recognition (HTR) model trained using one or more different images of handwriting samples. In some cases, the first sequence of letters or words are different from the second sequence of letters or words. In some cases, the coded text input includes one or more Unicode characters.

Yet another example embodiment provides a system for generating a digital image of simulated handwriting. The system includes a means for extracting, using a neural network, a style description vector from an image of a handwriting sample, the style description vector representing a style of a first sequence of letters or words in at least a portion of the image of the handwriting sample; a means for generating, using the neural network, a simulated handwriting image based on the style description vector and a variable length coded text input having a second sequence of letters or words, the simulated handwriting image containing the second sequence of letters or words in the style of the first sequence of letters or words; a storage; and at least one processor operatively coupled to the storage, the at least one processor configured to execute instructions stored in the storage that when executed cause the processor to carry out a process. The process includes causing the simulated handwriting image to be one or more of displayed on a display, added to a digital document, saved to a memory, or printed by a printer. In some cases, the means for extracting the style description vector includes a convolutional neural network (CNN). In some cases, the means for extracting the style description vector includes an attention function applied to at least a portion of the image of the handwriting sample. In some cases, the means for generating the simulated handwriting image includes an encoder-encoder structure, wherein the encoder is configured to map the image of the handwriting sample to the style description vector, and wherein the decoder is configured to generate the simulated handwriting image from the style description vector and the coded text input. In some cases, the means for generating the simulated handwriting image is further based on a predicted width of characters in the simulated handwriting image, a predicted spacing of the characters in the simulated handwriting image, and an input mask, the input mask defining a predicted region where the characters are to be rendered in the simulated handwriting image. In some cases, the system includes a means for applying a post-processing function to the raw generated image to produce the simulated handwriting image. In some cases, the post-processing function includes a Cycle Generative Adversarial Network (Cycle-GAN) image translation model. In some cases, the process further includes training the neural network using the simulated handwriting image and a handwritten text recognition (HTR) model trained using one or more different images of handwriting samples. In some cases, the coded text input includes one or more Unicode characters.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method for simulating handwriting, the method comprising:
    extracting, by at least one processor using a neural network, a style description vector from an image of a handwriting sample, the style description vector representing a style of a first sequence of characters in at least a portion of the image of the handwriting sample;
    receiving a variable length coded text input having a second sequence of characters;
    determining a predicted width associated with at least some of the characters in the second sequence; and
    generating, by the at least one processor using the neural network, an image of simulated handwriting based on the style description vector, the variable length coded text input, and the predicted width, the image of simulated handwriting containing the second sequence of characters in the style of the first sequence of characters;
    wherein the second sequence of characters includes one or more new characters that were not included in the first sequence of characters.

2. The method of claim 1, further comprising causing the image of simulated handwriting to be displayed on a display.

3. The method of claim 1, wherein the style description vector is a concatenation of a neural global pooling function vector and a neural attention function vector.

4. The method of claim 1, further comprising generating, by the at least one processor using the neural network, an input mask defining a predicted region in the image of simulated handwriting where the second sequence of characters is to be positioned, wherein the input mask is generated using a gated recurrent unit based on the coded text input concatenated with the style description vector.

5. The method of claim 1, further comprising generating, by the at least one processor using the neural network, an input mask defining a predicted region in the image of simulated handwriting where the second sequence of characters is to be positioned.

6. The method of claim 1,
    further comprising generating, by the at least one processor using the neural network, an input mask defining a predicted region in the image of simulated handwriting where the second sequences of characters is to be positioned; and
    wherein generating the image of simulated handwriting further comprises positioning the second sequence in the predicted region.

7. The method of claim 1, further comprising determining a predicted spacing associated with at least some of the characters in the second sequence, wherein the image of simulated handwriting is generated further based on the predicted spacing.

8. The method of claim 1, further comprising using a feed-forward network to apply background noise to the image of simulated handwriting.

9. A computer program product including one or more non-transitory machine-readable media having instructions encoded thereon that, when executed by at least one processor, cause a process for simulating handwriting to be carried out, the process comprising:
    extracting, by at least one processor using a neural network, a style description vector from an image of a handwriting sample, the style description vector representing a style of a first sequence of characters in at least a portion of the image of the handwriting sample;

receiving a variable length coded text input having a second sequence of characters;

determining a predicted spacing associated with at least some of the characters in the second sequence; and generating, by the at least one processor using the neural network, an image of simulated handwriting based on the style description vector, the variable length coded text input, and the predicted spacing, the image of simulated handwriting containing the second sequence of characters in the style of the first sequence of characters;

wherein the second sequence of characters includes one or more new characters that were not included in the first sequence of characters.

10. The computer program product of claim 9, wherein the process further comprises causing the image of simulated handwriting to be displayed on a display.

11. The computer program product of claim 9, wherein the style description vector is a concatenation of a neural global pooling function vector and a neural attention function vector.

12. The computer program product of claim 9, wherein the process further comprises generating, by the at least one processor using the neural network, an input mask defining a predicted region in the image of simulated handwriting where the second sequence of characters is to be positioned.

13. The computer program product of claim 9, wherein:
the process further comprises generating, by the at least one processor using the neural network, an input mask defining a predicted region in the image of simulated handwriting where the second sequence of characters is to be positioned; and generating the image of simulated handwriting further comprises positioning the second sequence in the predicted region.

14. The computer program product of claim 9, wherein:
the process further comprises determining a predicted width associated with at least some of the characters in the second sequence; and the image of simulated handwriting is generated further based on the predicted width.

15. The computer program product of claim 9, wherein the process further comprises using a feed-forward network to apply background noise to the image of simulated handwriting.

16. A computer program product including one or more non-transitory machine-readable media having instructions encoded thereon that, when executed by at least one processor, cause a process for simulating handwriting to be carried out, the process comprising:

extracting, by at least one processor using a neural network, a style description vector from an image of a handwriting sample, the style description vector representing a style of a first sequence of characters in at least a portion of the image of the handwriting sample;

generating, by the at least one processor using the neural network, an input mask defining a predicted region in an output image of simulated handwriting where a second sequence of characters is to be positioned; and generating, by the at least one processor using the neural network, the output image of simulated handwriting based on the style description vector and a variable length coded text input including the second sequence of characters, the output image of simulated handwriting containing the second sequence of characters in the style of the first sequence of characters;

wherein the second sequence of characters includes one or more new characters that were not included in the first sequence of characters.

17. The computer program product of claim 16, wherein the process further comprises causing the output image of simulated handwriting to be displayed on a display.

18. The computer program product of claim 16, wherein the style description vector is a concatenation of a neural global pooling function vector and a neural attention function vector.

19. The computer program product of claim 16, wherein the process further comprises using a feed-forward network to apply background noise to the output image of simulated handwriting.

20. The computer program product of claim 16, wherein the input mask is generated using a gated recurrent unit based on the coded text input concatenated with the style description vector.

* * * * *

UNITED STATES PATENT AND TRADEMARK OFFICE
CERTIFICATE OF CORRECTION

PATENT NO. : 11,899,927 B2
APPLICATION NO. : 17/648718
DATED : February 13, 2024
INVENTOR(S) : Christopher Alan Tensmeyer et al.

It is certified that error appears in the above-identified patent and that said Letters Patent is hereby corrected as shown below:

In the Claims

In Column 20, Line 47, Claim 6:
Please replace "sequences" with --sequence--.

Signed and Sealed this
Twenty-sixth Day of March, 2024

Katherine Kelly Vidal
Director of the United States Patent and Trademark Office